Sept. 12, 1950 G. L. COFFEY 2,521,901
CONTROL FOR AUTOMATICALLY REVERSING
THE CARRIAGE FEED OF A LATHE Filed Oct. 22, 1946 2 Sheets-Sheet 1

INVENTOR
G. L. COFFEY
BY
ATTORNEY

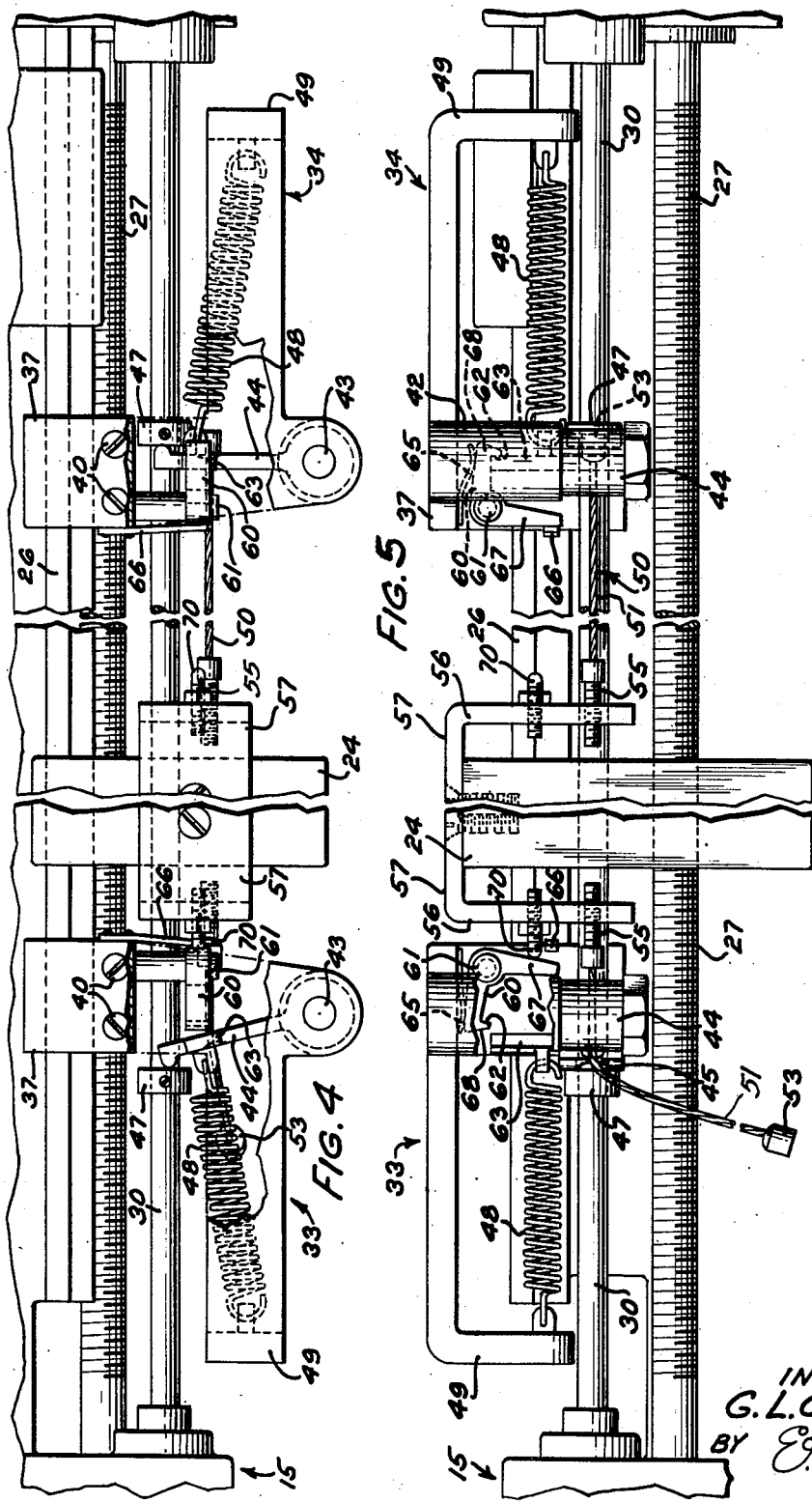

Patented Sept. 12, 1950

2,521,901

UNITED STATES PATENT OFFICE 2,521,901

CONTROL FOR AUTOMATICALLY REVERSING THE CARRIAGE FEED OF A LATHE

George L. Coffey, Chicago, Ill., assignor to Western Electric Company, Incorporated, New York, N. Y., a corporation of New York Application October 22, 1946, Serial No. 704,913

8 Claims. (Cl. 82—21)

This invention relates to a control for automatically reversing the carriage feed of a lathe and more particularly to a control for automatically reversing the carriage feed of a lathe used in cutting distributing screws.

In the cutting of distributing screws, in one method as heretofore practiced, the power drive for rotating the work and for advancing the carriage and the cutting tool thereon is disconnected to stop the drive when the cutting tool reaches a point just short of the ends of the reversing threads being cut in the work. The operator, then, by engaging the chuck, manually actuates the drive to feed the tool at a slow controlled rate to the end of the screw thread being cut and to stop the tool at the precise point where the tool and the carriage should be reversed. He then actuates a reversing lever which, through a control rod, conditions the drive reversing mechanism to drive the carriage in a reverse direction when the automatic drive is again started.

It is an object of the present invention to provide a mechanism for automatically and instantly actuating the reversible drive of a lathe to effect instant reversal of the movement of the carriage at a predetermined point in its travel.

In one embodiment of the invention, a lathe set up for cutting distributing screws and which has a reciprocable carriage and a drive therefor reversible under control of a shiftable control rod, is provided with a pair of control rod shifting devices adjustably mounted on the lathe in the path of movement of the carriage and on opposite sides thereof for instantly shifting the control rod in opposite directions under control of the carriage to actuate the drive reversing mechanism and effect reversal of movement of the carriage. The shifting devices comprise pivoted arms, which are spring-stressed in opposite directions and engageable with collars on the control rod for shifting the rod alternately in opposite directions and the arms are retracted alternately to a set position during the reverse travel of the carriage by members attached thereto and the arms are held in the set positions by latches which are tripped alternately by the carriage at the end of a predetermined movement thereof in opposite directions to release the spring stressed arms, which instantly shift the control rod alternately in opposite directions and thus instantly effects the reversal of the carriage drive and the direction of movement of the carriage.

A more complete understanding of the invention may be had by reference to the following detailed description and the accompanying drawings illustrating a preferred embodiment of the invention in which:

Fig. 1 is a somewhat diagrammatic plan view of a conventional lathe set up to cut a distributing screw and having a conventional drive and a shiftable control rod for effecting the reversal of the drive and showing the devices thereon for automatically shifting the control rod;

Fig. 2 is an enlarged fragmentary elevational view of a distributing screw;

Fig. 3 is an enlarged perspective view showing one of the shifting devices and a portion of the associated lathe;

Fig. 4 is an enlarged fragmentary plan view of the lathe showing the shifting devices thereon; and Fig. 5 is a side elevational view of the mechanism shown in Fig. 4 with parts broken away.

Referring to Fig. 1 of the drawings, there is illustrated in somewhat diagrammatic form a conventional lathe 15 set up to cut a reversing thread 16 (Fig. 2) of a distributor screw in a rod 17. The rod 17, in which the thread 16 is to be cut, is mounted for rotation in a chuck 19 and a tail stock spindle 20, the former of which is rotated in a well-known manner by a conventional lathe drive (not shown). A tool 22 is clamped in a tool rest 23 mounted for transverse movement on the carriage 24, which is longitudinally slidable on ways 25, 26 of the lathe 15. The carriage 24 is moved longitudinally on the lathe in opposite directions by a lead screw 27 having a conventional driving connection therewith and which drive is synchronized with that of the chuck 19 through a conventional gearing and reversing mechanism (not shown). The conventional drive reversing mechanism (not shown) is actuated to reverse the drive in response to a longitudinal movement of a control rod 30 extending longitudinally of the lathe so that when the control rod 30 is moved in one direction, the lead screw 27 is caused to rotate to move the carriage in one direction and when the control rod 30 is moved in the opposite direction, the lead screw 27 is caused to rotate and move the carriage in the reverse direction.

In cutting the reversing thread 16 in the rod 17, it is essential that the tool 22 be stopped in its longitudinal movement at the precise points 31 and 32 (Fig. 2) defining the ends of the thread 16 in order that the thread 16 be properly cut and to prevent damage to the tool 22 which would be caused by excess movement of the tool. To stop the movement of the tool at points 31 and 32 and to instantly reverse the direction of movement of the tool, control rod shifting devices 33 and 34 are provided. The control rod shifting devices 33 and 34 are adjustably mounted on the lathe way 25 in the path of movement of the carriage 24 and on opposite sides thereof and are actuated by the carriage at the end of its predetermined movement in opposite directions to cause the devices 33 and 34 alternately to shift the control rod 30 and effect a reversal of the carriage feed.

Each control rod shifting device comprises a bracket 37 (Fig. 3) recessed at 38 to receive the lathe way 25 and be clamped thereto by means of a clamping plate 39 drawn into clamping engagement against the way 25 by a pair of bolts 40. An arm 41 of the bracket extends laterally from the lathe and is provided with a boss 42 for receiving a vertical headed pin or shaft 43 on which an actuating arm or lever 44 is pivotally mounted. One end of the arm 44 is slotted, as at 45, to receive the control rod 30 and is adapted to engage a collar 47 adjustably secured on the control rod 30. A helical spring 48, connected at one end to an arm 49 of the bracket 37 and at its other end to the arm 44, stresses the arm for rocking movement in one direction about the vertical pin 43 and causes it to engage the collar 47 and shift the control rod 30 in one direction.

The arm 44 is adapted to be moved in the reverse direction during the reverse movement of the carriage through a connector member 50 carried thereby. The embodiment illustrated herein of the connector member comprises a flexible cable 51, one end of which passes through a hole 52 in the arm 44 and is secured to an enlarged knob 53 for engaging the arm 44 and the other end of the cable 51 is secured to a threaded rod 55 adjustably secured to the vertical portion 56 of an L-shaped bracket 57 mounted on the carriage 24. The carriage, as it nears the end of its reverse movement, acts, through the connector members 50, to move the arm 44 to a forward or set position to provide a clearance for movement of the collar 47 and the rod 30 in one direction and to increase the tension on the spring 48.

A latch member 60 pivoted at 61 to the bracket 37 and provided with a shoulder 62 is adapted to engage a member 63 on the arm 44 and hold the arm in its set or biased position. The latch member is urged in a downward direction by a leaf spring 65 secured to the bracket 37 and the movement of the latch 60 is arrested by a stop 66 mounted on the bracket 37 and which engages an arm 67 forming a part of the latch 60. The inclined face 68 is formed on the end of the latch member 60 to permit the latch to be cammed upwardly by the member 63 of the arm 44 as the member 63 passes thereunder into latching engagement with the latch 60. A trip member 70, adjustably mounted on the bracket 57 of the carriage 24, is aligned with the arm 67 of the latch 60 and is adapted to engage the arm 67 and trip the latch at a predetermined point in the movement of the carriage 24 to release the spring biased arm 44, which instantly shifts the control rod 30 to effect the instant reversal of the carriage drive and the reversal of movement of the carriage.

It will be understood that the structure of the devices 33 and 34, though similar, are reversed with respect to each other, one being right-handed and designed to instantly shift the control rod in one direction, and the other left-handed and designed to shift the control rod instantly in the opposite direction.

In the setting up of the devices 33 and 34 on the lathe and with the rod 17 in position in the lathe, the carriage 24 may be moved so that the tool 22 carried thereby is at the end of its forward movement and is positioned opposite the point 32 of the reversing feed screw thread 16. The device 34 is then clamped in approximate adjusted position on the lathe and the trip member 70 cooperating therewith is accurately adjusted on the bracket 57 of the carriage to trip the latch 60 and release the lever 44 when the carriage, in its movement, reaches this point. The collar 47 on the control rod 30 is secured in adjusted position adjacent the arm 44 so that when the arm 44 is released, it will engage the collar and shift the rod. The carriage may then be moved in a reverse direction so that the tool 22 carried thereby is at the other end of its travel and located directly opposite the point 31 of the reversing thread 16 to be cut in the rod 17. With the carriage in this position, the device 33 may be clamped onto the lathe in approximate adjusted position and the trip member 70 cooperating therewith is adjusted to trip the latch 60 and release the actuating arm 44 at this point in the movement of the carriage. The collar 47 associated with the device 33 is also secured in adjusted position on the rod 30. While the carriage is in this position, the connecting member 50 associated with the device 34 is adjusted to a position where it retracts the arm 44 to its set or biased position, where it will be maintained by the latch 60. The carriage may then be moved to the end of its travel in the opposite or right-hand direction and the connecting member 50 associated with the device 33 is adjusted to retract the actuating arm 44 of the device 33 to its set or biased position, where it is latched by the member 60.

With the devices 33 and 34 properly adjusted, the automatic lathe drive may be connected and the tool rest advanced to move the tool 22 into cutting engagement with the rod 17. As the carriage approaches the end of its movement to the right, as viewed in Fig. 1, the arm 44 of the device 33 is reset to its latched position by the connector member 50 associated therewith and when the carriage has reached the end of its movement, the trip member 70 carried thereby and associated with the shifting device 34 will trip the latch 60 of the device 34 and release the spring-biased actuating arm 44, which instantly shifts the control rod 30 to the right to reverse the carriage drive and move the carriage to the left. As the carriage approaches the end of its movement in the reverse direction or to the left, the same cycle of operation is repeated to reverse the travel of the carriage; namely, the arm 44 of the device 34 is reset to its latched position by the connector 50 associated therewith and when the carriage has reached the end of its movement, the trip member 70 acts to trip the latch 60 and release the actuating arm 44 of the device 33 to instantly effect the reversal of the carriage drive.

Thus, with the present mechanism for automatically reversing the carriage drive at each end of its movement in opposite directions, it is only necessary for the operator to feed the tool into the work in small increments at the beginning of each forward movement of the carriage without the need of stopping the lathe until the thread-cutting operation is completed.

What is claimed is:

1. In a lathe having a reciprocable carriage and a drive therefor reversible under control of an axially shiftable control rod, an actuating member movable relative to said rod for moving said rod axially in one direction, means for stressing said actuating member for movement in said one direction, means operable in response to the reverse movement of said carriage for moving the actuating member axially in a reverse direction to a set position, latch means releasably engageable with said actuating member for holding said member in the set position, and means forming part of said carriage for actuating said latch at a predetermined point in the movement thereof to release said actuating member whereby said member instantly shifts said control rod to effect the reversal of the carriage drive.

2. In a lathe having a reciprocable carriage and a drive therefor reversible under control of an axially shiftable control rod, an actuating member movable relative to and engageable with said rod for moving said rod axially in one direction, spring means for stressing the actuating member for movement in said one direction, means connected to the carriage and operable in response to the reverse movement thereof for moving said actuating member in a reverse direction to a set position to load said spring means, latch means for holding the actuating member in said set position, and means movable with the carriage for tripping the latch means at a predetermined point in the movement of said carriage whereby said actuating member is released to instantly shift said control rod to effect a reversal of the carriage drive.

3. In a lathe having a reciprocable carriage and a drive therefor reversible under control of an axially shiftable control rod, a pair of actuating means adjustably secured to the lathe on opposite sides of the carriage and including a pair of members stressed for movement in opposite directions to move said control rod axially in opposite directions, means connected to the carriage for retracting said members alternately to set positions, latch means releasably engageable with said members for holding said actuating means in said set positions, and means movable with the carriage for alternately actuating said latch means at predetermined points in the reverse movements of the carriage alternately to effect the release of the actuating means and cause an instant shifting of said control rod alternately in reverse direction to effect the instant reversal of said carriage drive.

4. In a lathe having a reciprocable carriage and a drive therefor reversible under control of an axially shiftable control rod, a pair of actuating members movable relative to said rod and stressed in opposite directions to move said rod axially in opposite directions, means connected to and movable with the carriage for retracting said actuating members alternately to set positions, latch means for holding said actuating members in said set positions, and means connected to and movable with the carriage for alternately tripping the latch members at predetermined points in the movement in opposite directions of said carriage whereby the stressed actuating members are released alternately to shift said control rod alternately in reverse directions to reverse the carriage drive.

5. In a lathe having a reciprocable carriage and a drive therefor reversible under control of a shiftable control rod, a control mechanism for shifting said control rod in opposite directions in response to a predetermined movement of the carriage in opposite directions comprising a pair of brackets adjustably secured on said lathe on opposite sides of said carriage, pivoted arms on said brackets engageable with said rod for shifting said rod alternately in opposite directions, spring means associated with said arms for stressing said arms in opposite directions, members movable with said carriage for alternately moving said pivoted arms to set positions in directions opposite to that imparted thereto by the spring means, latches on said brackets for holding said arms in said set positions, and means forming part of said carriage for alternately actuating said latches at predetermined points in its reverse movements to release the arms which instantly shift the control rod alternately in opposite directions to effect the instant reversal of the carriage rod.

6. A lathe controlling apparatus for use with a lathe which has ways, a carriage movable on the ways and a control rod for controlling the direction of movement of the carriage on the ways comprising a bracket, means for clamping the bracket on one of said ways in adjusted position relative to said rod, a spring actuated arm pivotally mounted on said bracket for shifting said control rod, a latch mounted on said bracket for holding said arm in inoperative position, a trip member movable with said carriage for tripping said latch to release the spring actuated arm, means for attaching said trip member to said carriage, and means for adjusting said trip member relative to said carriage.

7. In a lathe having a reciprocable carriage and a drive therefor reversible under control of a shiftable control rod, a control mechanism for shifting said control rod in opposite directions in response to a predetermined movement of the carriage in opposite directions comprising a pair of brackets adjustably secured on said lathe on opposite sides of said carriage, pivoted arms on said brackets engageable with said rod for shifting said rod alternately in opposite directions, spring means associated with said arms for stressing said arms in opposite directions, members movable with said carriage for alternately moving said pivoted arms to set positions in directions opposite to that imparted thereto by the spring means, latches on said brackets for holding said arms in said set positions, means forming part of said carriage for alternately actuating said latches at predetermined points in its reverse movements to release the arms which instantly shift the control rod alternately in opposite directions to effect the instant reversal of the carriage rod, and means for adjusting the position of the members for moving the pivoted arms with respect to the carriage to determine the position of reset of said pivoted arms.

8. In a lathe having a reciprocable carriage and a drive therefor reversible under control of an axially shiftable control rod, a control mechanism for shifting said control rod in opposite directions in response to a predetermined movement of the carriage in opposite directions comprising a pair of brackets adjustably secured on said lathe on opposite sides of said carriage, pivoted arms on said brackets engageable with said rod for axially shifting said rod alternately in opposite directions, spring means associated with said arms for stressing said arms in opposite directions, members movable with said carriage for alternately moving said pivoted arms to set positions in directions opposite to that imparted thereto by the spring means, latches on said brackets for holding said arms in said set positions, and means operable in response to predetermined movements in opposite directions of said carriage for alternately tripping said latches and effecting the shifting of the control rod alternately in opposite directions.

GEORGE L. COFFEY.

REFERENCES CITED

The following references are of record in the file of this patent:

UNITED STATES PATENTS

| Number | Name | Date |
|---|---|---|
| 1,052,279 | Runge | Feb. 4, 1913 |
| 2,101,754 | Randall | Dec. 7, 1937 |